United States Patent [19]

Hayashi et al.

[11] Patent Number: 4,688,450
[45] Date of Patent: Aug. 25, 1987

[54] METHOD AND SYSTEM FOR SHIFT CONTROL IN AN AUTOMATIC TRANSMISSION FOR A VEHICLE

[75] Inventors: Kazuhiko Hayashi, Nagoya; Kunihiro Iwatsuki, Toyota, both of Japan

[73] Assignee: Toyota Jidosha Kabushiki Kaisha, Toyota, Japan

[21] Appl. No.: 889,353

[22] Filed: Jul. 25, 1986

[30] Foreign Application Priority Data

Jul. 26, 1985 [JP] Japan .................... 60-166573

[51] Int. Cl.$^4$ .................. B60K 41/18; B60K 41/04
[52] U.S. Cl. ............................. 74/866; 74/858; 364/424.1
[58] Field of Search ............ 74/866, 858; 364/424.1

[56] References Cited

U.S. PATENT DOCUMENTS

| | | | |
|---|---|---|---|
| 4,266,447 | 5/1981 | Heess et al. | 74/858 |
| 4,355,550 | 10/1982 | Will et al. | 74/858 X |
| 4,485,443 | 11/1984 | Knödler et al. | 74/866 X |
| 4,493,228 | 1/1985 | Vukovich et al. | 74/858 |

Primary Examiner—Leslie Braun
Assistant Examiner—Dirk Wright
Attorney, Agent, or Firm—Oblon, Fisher, Spivak, McClelland, & Maier

[57] ABSTRACT

A method and system for shift control in an automatic transmission for a vehicle, wherein, during shifting, engine torque is changed to thereby maintain the shift characteristics satisfactorily, and wherein at least engine torque control in association with 1st shifting is stopped when a 2nd shifting command is emitted before 1st shifting is completed. When only the engine torque control in association with 1st shifting is stopped, thereafter, only the engine torque control in association with 2nd shifting can be performed, so that unnecessary torque control can be dispensed with. Furthermore, when engine torque controls in association with not only the 1st shifting but also the 2nd shifting are stopped, an unnecessary change in the engine torque control can be dispensed with in the case of shifting in which the shifting operation is not substantially performed.

9 Claims, 11 Drawing Figures

FIG.IB
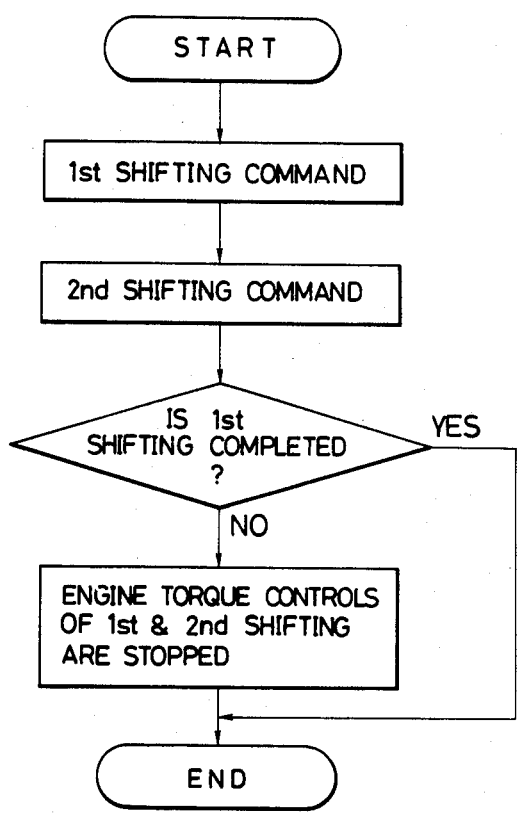

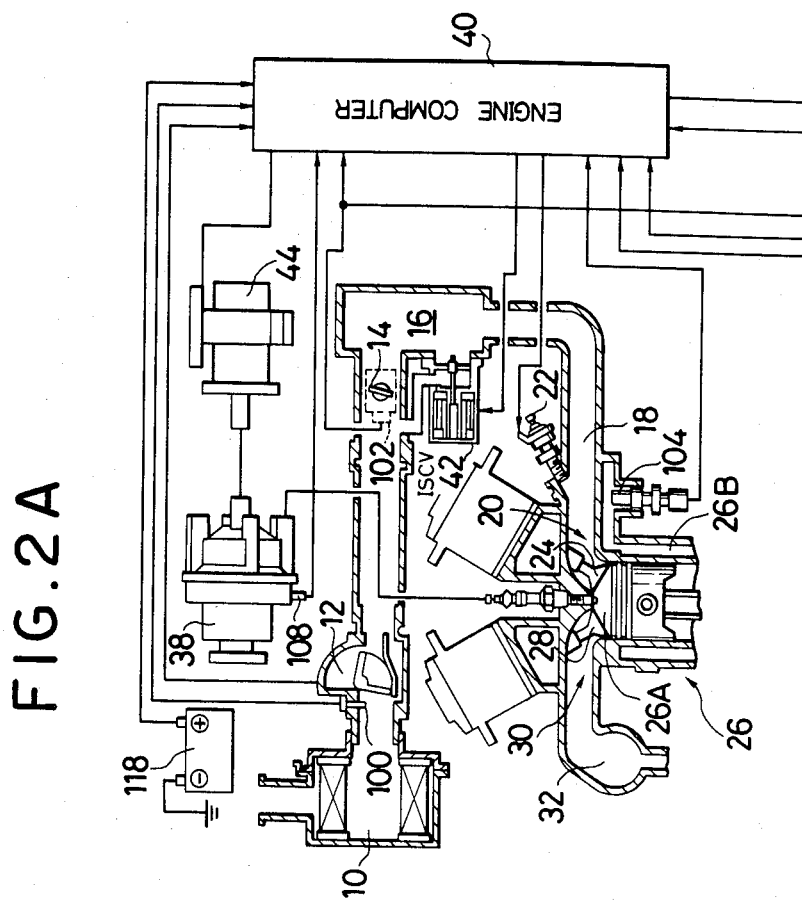

FIG.3

| SHIFT POSITION | | C0 | C1 | C2 | B0 | B1 | B2 | B3 | F0 | F1 | F2 |
|---|---|---|---|---|---|---|---|---|---|---|---|
| P | | ○ | | | | | | | | | |
| R | | ○ | | ○ | | | | ○ | | | |
| N | | ○ | | | | | | | | | |
| D | 1ST | ○ | ○ | | | | | | | △ | △ |
| | 2ND | ○ | ○ | | | | ○ | | △ | △ | |
| | 3RD | ○ | ○ | ○ | | | ○ | | △ | | |
| | O/D | | ○ | ○ | ○ | | ○ | | | | |
| 2 | 1ST | ○ | ○ | | | | | | △ | | △ |
| | 2ND | ○ | ○ | | | ○ | ○ | | △ | △ | |
| | 3RD | ○ | ○ | ○ | | | ○ | | △ | | |
| L | 1ST | ○ | ○ | | | | | ○ | △ | | △ |
| | 2ND | ○ | ○ | | | ○ | ○ | | △ | △ | |

○---OPERATING
△---OPERATING ONLY DURING DRIVING

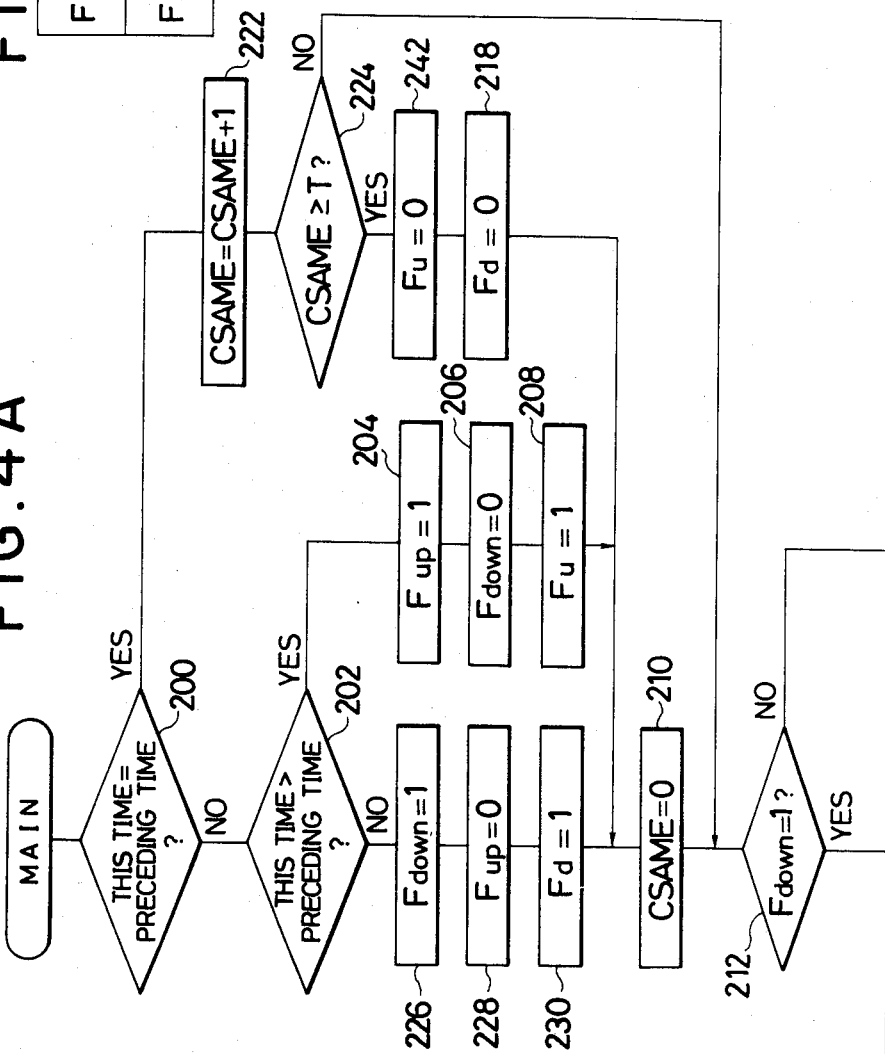

METHOD AND SYSTEM FOR SHIFT CONTROL IN AN AUTOMATIC TRANSMISSION FOR A VEHICLE

BACKGROUND OF THE INVENTION

1. Field of the Invention

This invention relates to a method and a system for shift control in an automatic transmission for a vehicle, and more particularly to improvements in a method and a system for shift control in an automatic transmission for a vehicle, wherein, during shifting, engine torque is changed by a predetermined value to thereby maintain the shift characteristics satisfactorily.

2. Description of the Prior Art

There has been widely known an automatic transmission for a vehicle constructed such that a gear shift mechanism and a plurality of frictionally engaging devices are provided, and a hydraulic control device is operated to selectively switch the engagement of the plurality of frictionally engaging devices, so that any one of a plurality of gear stages can be achieved.

In general, the automatic transmission for a vehicle of the type described is provided with a shift lever operated by a driver. In addition, in accordance with the range of the shift lever, the engagement of the frictionally engaging devices can be automatically switched in association with vehicle speed, throttle opening and the like.

Applicant has proposed various methods of controlling an engine integrally with an automatic transmission of the type described, wherein, during shifting, engine torque is changed to obtain satisfactory shift characteristics and to secure and improve the durability of the frictionally engaging devices (for example, Japanese Patent Laid-open application Ser. No. 129,341 laid open on June 17, 1986). More specifically, this integral control contemplates that, during shifting, a transmitted torque value from the engine is changed, whereby the energy absorption levels in various members in the automatic transmission or the frictionally engaging devices for braking these members are controlled to achieve a shift with a low shift shock for a short period of time, so that a satisfactory shift feeling can be provided to the driver and the frictionally engaging devices can be improved in terms of durability.

In the above-noted art, the engine torque control has been controlled in response to each shifting signal. However, in this case, for example, when quick shifting is instructed in the order of 1st gear—2nd gear—1st gear, 2nd gear—1st gear—2nd gear or the like, if the shifting is instructed before 1st shifting is substantially initiated, then engine torque control need not be performed and rather should not be performed from the viewpoint of the shift shock.

SUMMARY OF THE INVENTION

The present invention has been developed to obviate the above-described disadvantages and has as its object the provision of a method and a system for shift control in an automatic transmission for a vehicle, wherein a wasteful engine torque control when so-called multi-stage shifts are performed or engine torque control, which should not be performed, are stopped so that smoothness of engine rotation can be maintained satisfactorily and shift shock can be reduced.

To achieve the above-described object, a first aspect of the present invention contemplates that, in a method of shift control in an automatic transmission for a vehicle, during shifting, engine torque is changed by a predetermined value to thereby maintain shift characteristics satisfactorily, as the technical gist thereof is shown in FIG. 1 (A), when 2nd shifting is instructed before 1st shifting is completed, engine torque control in association with 1st shifting is stopped.

To achieve the above-described object, a second aspect of the present invention contemplates that, in a method of shift control in an automatic transmission for a vehicle, during shifting, engine torque is changed by a predetermined value to maintain the shift characteristics satisfactorily, as the technical gist is shown in FIG. 1 (B), when 2nd shifting is instructed before 1st shifting is completed, the engine torque control of both 1st and 2nd shiftings are stopped.

According to the first aspect of the present invention, when 2nd shifting is instructed before 1st shifting is completed, the engine control in association with 1st shifting is stopped, whereby, thereafter, as soon as a condition for performing the engine torque control in association with 2nd shifting is established, only the engine torque control in association with 2nd shifting can be performed, so that wasteful torque control can be dispensed with.

On the other hand, according to the second aspect of the present invention, when 2nd shifting is instructed before the 1st shifting is completed, the engine torque control of both 1st and 2nd shiftings are stopped, whereby, for example, in the case of the above-described apparent shiftings of 1st gear—2nd gear—1st gear, i.e. shifting in which the shift operation is not substantially performed (there being many such shiftings in the multi-gear stage shifts), the engine torque controls can be stopped, so that the engine torque is not changed unnecessarily.

According to the present invention, in the case of the so-called multi-gear stage shifts in which two or more shiftings are performed for a short period of time, wasteful engine torque control or engine torque control which should not be performed, can be prevented from being carried out.

BRIEF DESCRIPTION OF THE DRAWINGS

The above objects, features and advantages of the present invention, as well as other objects and advantages thereof, will become more apparent from the description which follows, taken in conjunction with the accompanying drawings, wherein like reference characters designate the same or similar parts and wherein:

FIGS. 1A and 1B are flow charts showing the technical aspects of the first and the second aspects of the present invention, respectively;

FIGS. 2A and 2B are general schematic block diagrams showing the automatic transmission combined with an electronic fuel injection engine for a motor vehicle, to which the present invention is applied;

FIG. 3 is a chart showing the actuated state of the respective frictionally engaging devices in the above automatic transmission;

FIGS. 4A and 4B are flow charts showing a main routine of an embodiment of the method of shift control in an automatic transmission for a vehicle according to the present invention;

DESCRIPTION OF THE PREFERRED EMBODIMENTS

The embodiments of the present invention will be described in detail with reference to the accompanying drawings.

Figure 1A:
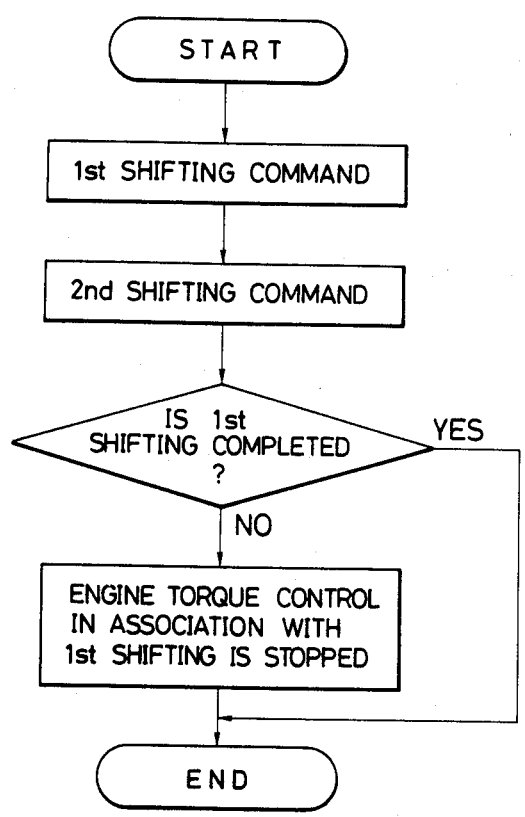
Figure 2B:
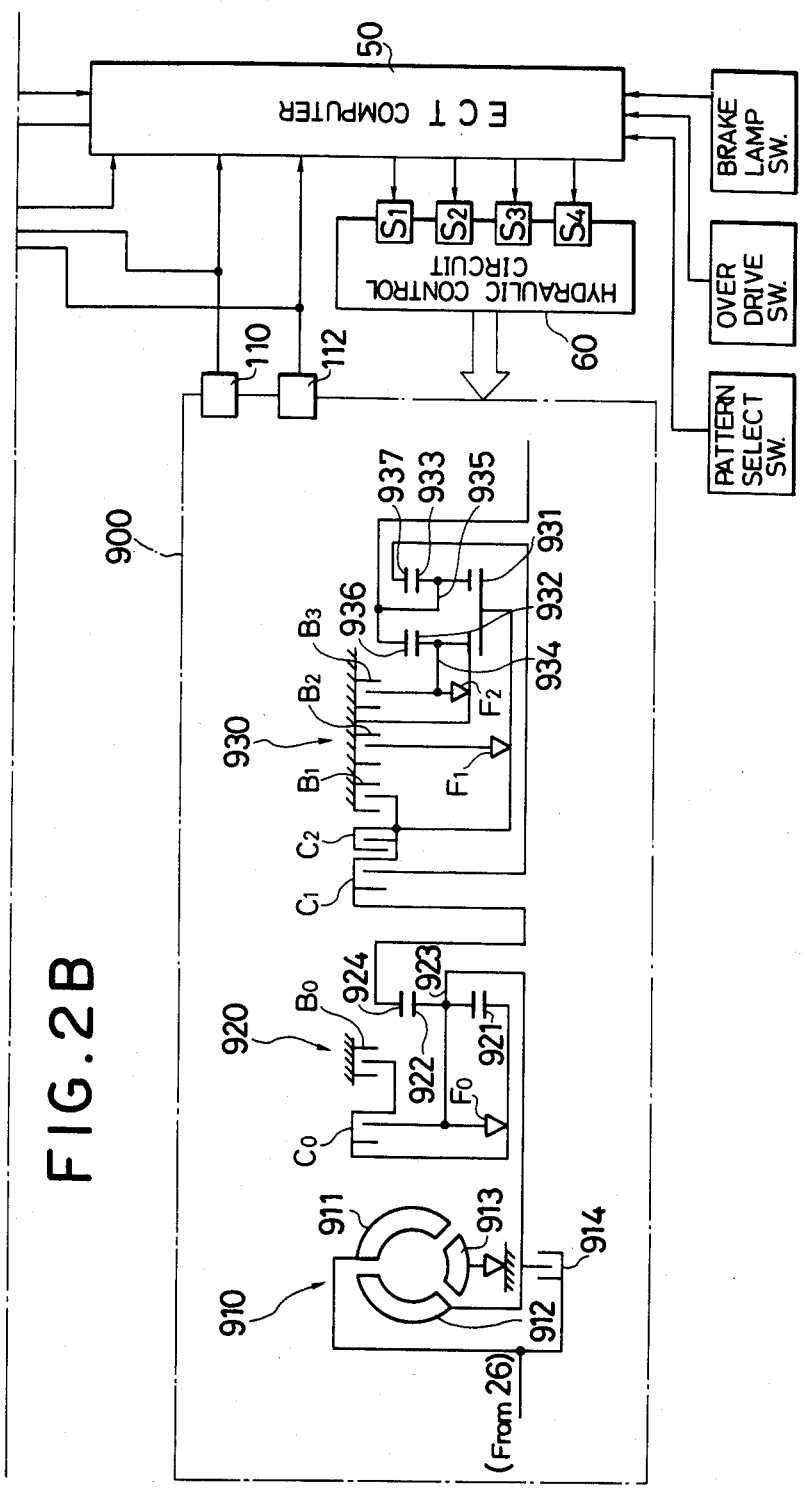

FIGS. 2A and 2B are the general arrangement drawings showing the automatic transmission combined with the intake-air quantity sensing type electronic fuel injection engine (hereinafter referred to as an "ECT"), to which is applied the embodiment of present invention.

Air drawn into an air cleaner 10 is successively delivered to an air flow meter 12, an intake throttle valve 14, a surge tank 16 and an intake manifold 18. This air is mixed with fuel injected from an injector 22 in the proximity of an intake port, and further delivered to a combustion chamber 26A of a main body 26 of the engine through an intake valve 24. The exhaust gas produced due to combustion of an air-fuel mixture in the combustion chamber 26A is exhausted to atmosphere through an exhaust valve 28, an exhaust port 30, an exhaust manifold 32 and an exhaust pipe (not shown).

An intake-air temperature sensor 100 is provided in the air flow meter 12, for detecting intake air temperature. The intake throttle valve 14 rotates in operational association with an accelerator pedal (not shown), which is provided adjacent the driver's seat. A throttle sensor 102 is provided in this intake throttle valve 14, for detecting the degree of throttle opening thereof. A water temperature sensor 104 is provided in a cylinder block 26B of the main body 26 of the engine for detecting an engine cooling water temperature. A crank angle sensor 108 is provided in a distributor 38 which has a shaft rotatable by a crankshaft of the main body 26 of the engine for detecting a crank angle from the rotation of the shaft.

A vehicle speed sensor 110 for detecting the vehicle speed from the rotation speed of an output shaft thereof, and a shift position sensor 112 for detecting a shift position are provided in the ECT.

Outputs from these sensors 100, 102, 104, 108, 110 and 112 are inputted to an engine computer 40. The engine computer 40 calculates the fuel injection flow rate and the optimum ignition timing by using the input signals from the sensors as parameters, and controls the injector 22 so that fuel flow commensurate with said fuel injection flow rate can be injected, and controls an ignition coil 44 so that the optimum ignition timing can be obtained.

An idle rotation speed control valve 42 driven by a step motor is provided in a bypass passage intercommunicating the upstream side of the throttle valve 14 with the surge tank 16, whereby idle rotation speed is controlled in response to a signal from the engine computer 40.

On the other hand, a transmission section 900 of the ECT in this embodiment includes a torque converter 910, an overdrive mechanism 920 and an underdrive mechanism 930.

The torque converter 910 includes a well-known pump 911, a turbine 912, a stator 913 and a lockup clutch 914.

The overdrive mechanism 920 includes a set of planetary gears consisting of a sun gear 921, a planetary pinion 922 in mesh with the sun gear 921, a carrier 923 supporting the planetary pinion 922 and a ring gear 924 in mesh with the planetary pinion 922. The rotating conditions of this planetary gear is controlled by a clutch Co, a brake Bo and a one-way clutch Fo.

The underdrive mechanism 930 includes two sets of planetary gears consisting of a common sun gear 931, planetary pinions 932 and 933, which mesh with the sun gear 931 respectively, carriers 934 and 935, which support the planetary pinions 932 and 933 respectively, and ring gears 936 and 937, which mesh with the planetary pinions 932 and 933 respectively. The rotating conditions of these two sets of planetary gears are controlled by clutches C1 and C2, brakes B1-B3 and one-way clutches F1 and F2. Since the connected state of the respective component parts of this transmission 900 is well known, only a skeletal diagram is shown in FIG. 2B and a detailed description thereof will be omitted.

In this embodiment, electromagnetic valves S1-S4 in a hydraulic control circuit 60 are driven and controlled in accordance with a preset shift pattern by an ECT computer inputted thereto with signals from the throttle sensor 102, the vehicle speed sensor 110 and so forth. As a result, a combination of the clutches, brakes and the like is formed as shown in FIG. 3, so that the shift control can be performed.

Additionally, marks o in FIG. 3 indicate the operated positions and marks Δ indicate the operational positions only when the engine is power on. Furthermore, the electromagnetic valves S1 and S2 control the underdrive mechanism 930, the electromagnetic valve S3 controls the overdrive mechanism 920, and the electromagnetic valve S4 controls the lockup clutch 914, respectively.

In the system of the type described, the engine computer 40, receiving shift information (i.e. shift judgment, a shift command, lockup clutch engagement permission and the like) from the ECT computer 50, performs the engine torque control in association with a signal from the intake-air temperature sensor 100.

Additionally, in this embodiment, the engine computer 40 and the ECT computer 50 are formed separately from each other, however, according to the present invention, the number of the control components and the control sharing areas need not necessary be limited.

Figure 4B:
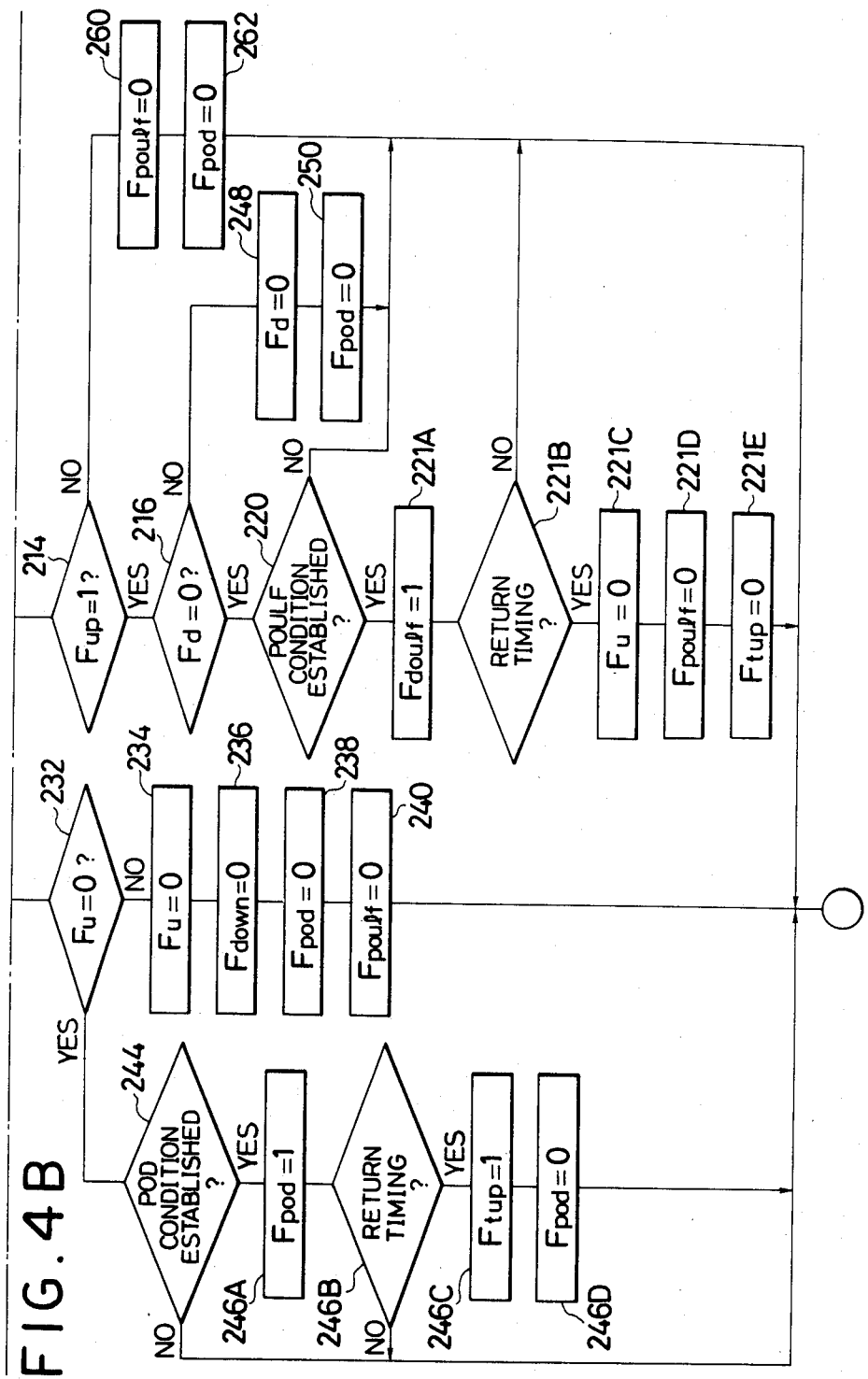
Figure 5:
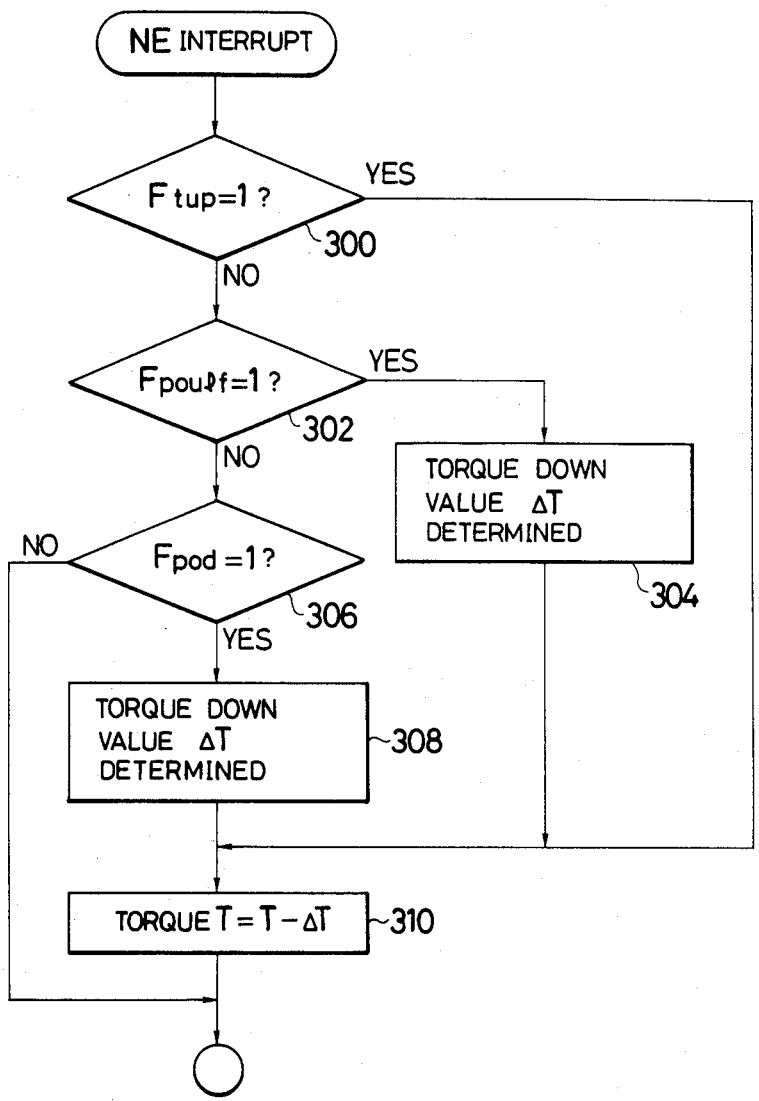
FIG. 5 is a flow chart showing an engine interrupt routine used in the embodiment.
Figure 6:
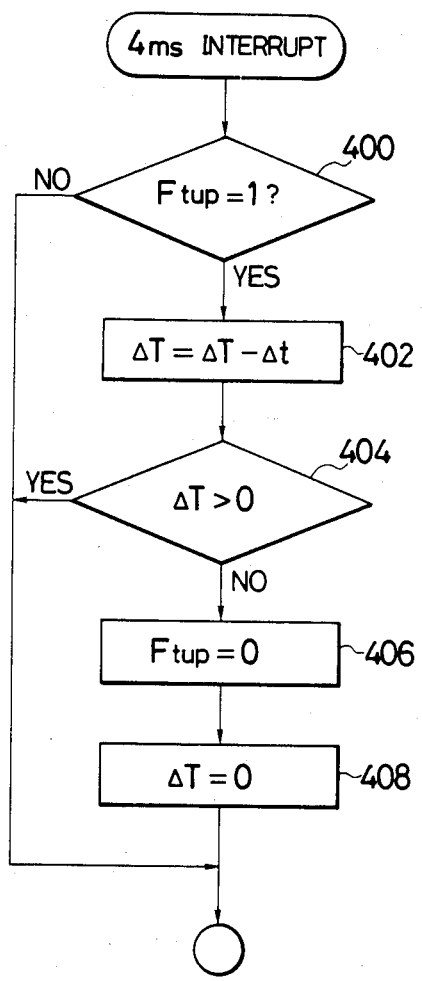
FIG. 6 is a chart showing a 4 ms interrupt routine used in the embodiment.

The engine torque control of the vehicle in this embodiment is performed in accordance with the flow chart shown in FIGS. 4 through 6.

FIG. 4 shows the main routine of the engine torque control in this embodiment, FIG. 5 shows the engine interrupt routine, and FIG. 6 shows the 4 ms interrupt routine.

First, the meanings of a set "1" and a reset "0" of various flags used in the respective routines will be described.

Flags Fdown indicates a time of a down shift in the set condition, a time of an up shift or a time of initiating return in the torque control in the reset condition.

Flag Fup indicates a time of an up shift in the set condition, a time of a down shift or a time of initiating return in the torque control in the reset condition.

Flag Fd indicates a time of a down shift in the set condition, a continued down shift, a lapse of Tsec, or a time of initiating return in the torque control in the reset condition.

Flag Fu indicates a time of an up shift in the set condition, a down shift within T sec, a lapse of Tsec, or a time of initiating return in the torque control in the reset condition.

Flag Fpod indicates power on down shifting or the initiation of the torque control in the set condition, the initiation of return in the torque control in the reset condition.

Flag Fpoulf indicates an upshift of a lockup clutch off or the initiation of the torque control in the set condition, or the initiation of restoration of the torque control in the reset condition.

Flag Ftup indicates a time of returning in the torque down control in the set condition, a time of completion of restoration of torque control in the reset condition.

The main routine shown in FIG. 4 will now be described hereinbelow.

In Step 200, a judgement is made as to whether or not the gear stages at this time and the preceding time are identical with each other. When it is judged that the gear stages are not identical, i.e. a shift command has been emitted, the routine proceeds to Step 202, where a judgement is made as to whether the gear stage at this time is larger than the gear stage at the preceding time, i.e. is it an up shift, or not.

Two cases including a case A where 1st shifting is an up shift and 2nd shifting is a down shift and another case B where 1st shifting is a down shift and 2nd shifting is an up shift, will be described hereinbelow.

In case A the 1st shifting is the up shift and the 2nd shifting is the down shift.

When, in Step 202, the judgement is YES, flags of Fup=1, Fdown=0 and Fu=1 are set in Steps 204-208, respectively, in Step 210, counter CSAME=0 is set. This CSAME is a counter for checking how much time has elapsed after a certain shift command is emitted.

Upon setting the flags in Steps 204-208, the routine enters the flow of Steps 212-214-216 and, in Step 216, a judgment is made as to whether or not flag Fd=0. Since this flag Fd has been initially reset to 0 in Step 218, the routine proceeds to Step 220. In Step 220, a judgment is made as to whether a condition for POULF, i.e. conditions for a power on up shift and a lockup off are established or not. When this condition is not established, i.e. even during the up shift, when the power is off and the shift shock and the durability are not necessary to be consider, the torque down control is not needed, or if the lockup is on and there is a possibility of a shock due to the torque reduction control, the flow is completed and a flow of Steps 220-222-224-212-214-216-220 is repeated.

Alternatively, when this condition is established, the routine proceeds to Steps 221A-221E, controls of the engine torque reduction and restoration is carried out in accordance with the interrupt routines shown in FIGS. 5 and 6 to be described hereinbelow.

Shortly, when a down shift command in association with 2nd shifting is emitted, the routine proceeds from Step 200 to 202. Since it is the down shift, the judgment in Step 202 becomes YES. As a consequence, in Steps 226-230, flags of Fdown=1, Fup=0 and Fd=1 are set, and further, the routine proceeds to Steps 210 and 212. Since the judgment is YES in Step 212, the routine proceeds to Step 232, where a judgment is made as to whether flag Fu=0 or not.

Here, while the time required from 1st shifting at the preceding time to 2nd shifting at this time is shorter than the predetermined time T, flag Fu=1 which has been set in Step 208 is maintained, whereby, in Steps 234-240, the flags of Fu=0, Fdown=0, Fpod=0 and Fpoulf=0 are reset. As a consequence, in this stage, both the engine torque controls of 1st and 2nd shiftings are stopped regardless of whether the torque reduction control in association with 1st shifting is under way or not.

Alternatively, when a sufficient time elapses by 2nd shifting after 1st shifting was performed, i.e. in the case of normal shifting other than the multi-gear stage shifts, the judgment is YES in Step 224. As a consequence, since flag Fu=0 is set in Step 242, the routine proceeds from Step 232 to 244. As a result, as soon as the condition of a power on down shift for 2nd shifting is established, the engine torque control is performed in Steps 246A-246D.

Additionally, Steps 260 and 262 are the Steps for immediately stopping the torque control when flag Fdown=0 and flag Fup=0.

In case B the 1st shifting is the down shift and the 2nd shifting is the up shift.

After the routine proceeded in the flow of Step 200-202-226-228-230-210, the judgment is YES in Step 212, and the routine proceeds to Step 232. Since flag Fu=0 was set initially, in Step 232, the judgment is YES, and the routine proceeds to Step 244. When it is judged that the condition of a power on down shift is established in Step 244, the routine enters the flow of the engine torque control of Step 246A and so forth. The condition is not established and even when it is a down shift, it is a power off and the shift shock is not possible and then the flow of Step 200-222-224-212-232-244 is repeated.

Shortly, when an up shift command as being 2nd shifting is emitted, the routine enters a flow of Steps 200-202-204-206-208-210-212 and a judgment is made as to whether flag Fdown=1 or not. In this case, since flag Fdown is reset to be 0 in Step 206, the judgment is No in Step 212, and the routine proceeds to Step 214. Since flag Fup is set at 1 in Step 204, the routine proceeds to Step 216, where a judgment is made as to whether flag Fd=0 or not. Since this flag Fd is set at 0 in Step 218 when a time from the completion of 1st shifting to the completion of 2nd shifting is longer than the predetermined time T, the routine proceeds to Step 220. If the time from the completion of 1st shifting to the completion of 2nd shifting is shorter than the predetermined time T, then setting of flag Fd=1 is maintained in Step 230. COnsequently, the routine proceeds to Step 248. However, flag Fd=0 is set in Step 248, with the result being that the routine similarly proceeds to Step 220, where a judgment is made as to whether the conditions of a power on up shift and a lockup off are established or not. As a consequence, in this case, as soon as the conditions are established, the torque down in association with 2nd shifting is performed without fail, however, the torque control in association with 1st shifting is immediately stopped by setting of flag Fpod=0 in Step 250.

The engine interrupt routine shown in FIG. 5 functions in the following manner. More particularly, when flag Fpoulf=1 or flag Fpod=1 is set in Step 302 or 306, the engine torque controls in Steps 304, 308 and so forth are performed. When the time of return reaches and flag Ftup=1 is set in Step 300, the torque return of the engine is gradually performed by $\Delta t$ in Step 310. When flag Ftup=1 is not set and a change to flag Fpoulf=0 or flag Fpod=0 is made, the torque control is immediately stopped.

In this case, the gradual return by $\Delta t$, when the time of return is reached and flag Ftup=1 is set, is carried out by the 4 ms interrupt routine shown in FIG. 6.

Namely, when flag Ftup=1 is set in Step 400, the calculations of $\Delta T = \Delta T - \Delta t$ are carried out in Step 402. The calculations are continued until $\Delta T$ becomes 0 or less in Step 404. As a consequence, in Step 310 (Refer to FIG. 5), $\Delta T$ is decreased by $\Delta t$ every 4 ms, with the result that torque T gradually returns by $\Delta t$. Additionally, Steps 406 and 408 are the steps for initializing the process.

In the above embodiment, when 1st shifting is an up shift and 2nd shifting in the form of a down shift comes before the 1st shifting is completed, the torque reduction of both 1st and 2nd shiftings are stopped. As a consequence, a shift command of a pattern, in which the number of the multi-gear stage shifts is largest and a shift is not substantially performed, is emitted, the engine torque control can be prevented from being performed (corresponding to the second aspect of the present invention).

Alternatively, when 1st shifting is a down shift and 2nd shifting in the form of an up shift comes before 1st shifting is completed, the engine torque control in association with 1st shifting is immediately stopped and the engine torque control of 2nd shifting can be performed as soon as the condition therefor is established. As a consequence, as for the engine torque reduction control of 2nd shifting, the engine torque control is not performed until the condition therefor is established, and, only when the condition therefor is established, the engine torque control is performed at the time of being established (corresponding to the first aspect of the present invention).

Additionally, according to the present invention, the first aspect of the present invention is more useful than the second aspect in that the possibility of the engine torque control of 2nd shifting remains. However, there are cases where the second aspect is more useful than the first aspect due to the following reasons. Namely, in the case of multigear stage shifts, most of the patterns are the patterns in which no shift is substantially performed as in 1st shifting—2nd shifting—1st shifting; according to the second aspect, the routines are simplified accordingly; when the condition of initiating the engine torque control is established by way of monitoring the engine rotation speed for example, if a change is made from an up shift to a down shift, then the condition of initiating the engine torque control of 2nd shifting is constantly established, so that it is practically impossible to carry out the first aspect of the present invention.

It will be apparent to those skilled in the art that variations and various modifications may be made in the elements of the invention without departing from the scope or spirit of the invention.

What is claimed is:

1. A method of shift control in an automatic transmission for a vehicle, wherein, during shifting, engine torque is changed by a predetermined value to thereby maintain the shift characteristics satisfactorily, which comprises:
   detecting emission of a 1st shifting command;
   detecting emission of a 2nd shifting command; and
   stopping engine torque control in association with said 1st shifting when said 2nd shifting command is emitted before said 1st shifting is completed.

2. A method of shift control in an automatic transmission for a vehicle as set forth in claim 1, wherein said engine torque control comprises control of torque reduction and restoration.

3. A method of shift control in an automatic transmission for a vehicle as set forth in claim 1, wherein said 1st shifting comprises a down shift and said 2nd shifting comprises an up shift.

4. A method of shift control in an automatic transmission for a vehicle as set forth in claim 1, which further comprises immediately stopping engine torque control in association with said 1st shifting when said 2nd shifting comes before said 1st shifting is completed and performing engine torque control of said 2nd shifting as soon as a condition for said 2nd shifting is established.

5. A system for shift control in an transmission for a vehicle, wherein, during shifting, engine torque is changed by a predetermined value to thereby maintain the shift characteristics satisfactorily, comprising:
   means for detecting an emission of a 1st shifting command;
   means for detecting an emission of a 2nd shifting command; and
   means for stopping engine torque control in association with said 1st shifting when said 2nd shifting command is emitted before said 1st shifting is completed wherein said means for stopping engine torque control is in communication with said means for detecting an emission of said 1st and 2nd shifting command.

6. A method of shift control in an automatic transmission for a vehicle, wherein, during shifting, engine torque is changed by a predetermined value to thereby maintain the shift characteristics satisfactorily, which comprises:
   detecting emission of a 1st shifting command;
   detecting emission of a 2nd shifting command;
   stopping engine torque control of both said 1st and 2nd shiftings when said 2nd shifting command is emitted before said 1st shifting is completed.

7. A method of shift control in an automatic transmission for a vehicle as set forth in claim 6, wherein said engine torque control comprises control of torque reduction and restoration.

8. A method of shift control in an automatic transmission for a vehicle as set forth in claim 6, wherein said 1st shifting comprises an up shift and said 2nd shifting comprises a down shift.

9. A system for shift control in an transmission for a vehicle, wherein, during shifting, engine torque is changed by a predetermined value to thereby maintain the shift characteristics satisfactorily, comprising:
   means for detecting an emission of a 1st shifting command;
   means for detecting an emission of a 2nd shifting command; and
   means for stopping engine torque controls of both said 1st and 2nd shiftings when said 2nd shifting command is emitted before said 1st shifting is completed wherein said means for stopping engine torque controls is in communication with said means for detecting an emission of said 1st and 2nd shifting command.

* * * * *